US012730937B2

(12) United States Patent
Mick, Jr. et al.

(10) Patent No.: US 12,730,937 B2
(45) **Date of Patent: *Sep. 8, 2026**

(54) CONTENT PLAYLIST INTEGRITY

(71) Applicant: Comcast Cable Communications, LLC, Philadelphia, PA (US)

(72) Inventors: John R. Mick, Jr., Denver, CO (US); Sean E. Bowman, Highlands Ranch, CO (US); Cory Zachman, Denver, CO (US); Christopher D. Brown, Denver, CO (US); Mark Niebur, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/824,281

(22) Filed: May 25, 2022

(65) Prior Publication Data

US 2022/0284130 A1 Sep. 8, 2022

Related U.S. Application Data

(63) Continuation of application No. 16/149,880, filed on Oct. 2, 2018, now Pat. No. 11,373,009.

(51) Int. Cl.

*G06F 21/64* (2013.01)
*G06F 16/438* (2019.01)
*G06F 21/60* (2013.01)

(52) U.S. Cl.
CPC .......... *G06F 21/64* (2013.01); *G06F 16/4387* (2019.01); *G06F 21/602* (2013.01)

(58) Field of Classification Search
None
See application file for complete search history.

(56) References Cited

U.S. PATENT DOCUMENTS

2014/0032987 A1* 1/2014 Nagaraj ................. H04N 19/00 714/E11.131
2015/0350205 A1* 12/2015 Oyman .................. G06F 21/10 726/7
2016/0188709 A1* 6/2016 Doerring ................ G06F 16/78 707/740
2016/0315956 A1* 10/2016 Giladi ................. H04L 63/1416
2017/0094338 A1* 3/2017 Kamekura ......... H04N 21/8456
2018/0007405 A1* 1/2018 McLean ............. H04N 21/2668
2018/0278990 A1* 9/2018 Rutland .................. H04L 67/02
2018/0343489 A1* 11/2018 Loheide ............. H04N 21/2668
2019/0313147 A1* 10/2019 Cava .................. H04N 21/2668
2020/0036766 A1 1/2020 Mahvash et al.

* cited by examiner

*Primary Examiner* — Nelson S. Giddins
(74) *Attorney, Agent, or Firm* — Banner & Witcoff, Ltd.

(57) ABSTRACT

Systems, apparatuses, and methods are described for protecting the integrity of a playlist, and/or for determining whether a playlist has been altered. The playlist may comprise references to segments of multiple content types. The references may be obfuscated, and/or confirmation data may be used to detect playlist alteration.

42 Claims, 8 Drawing Sheets

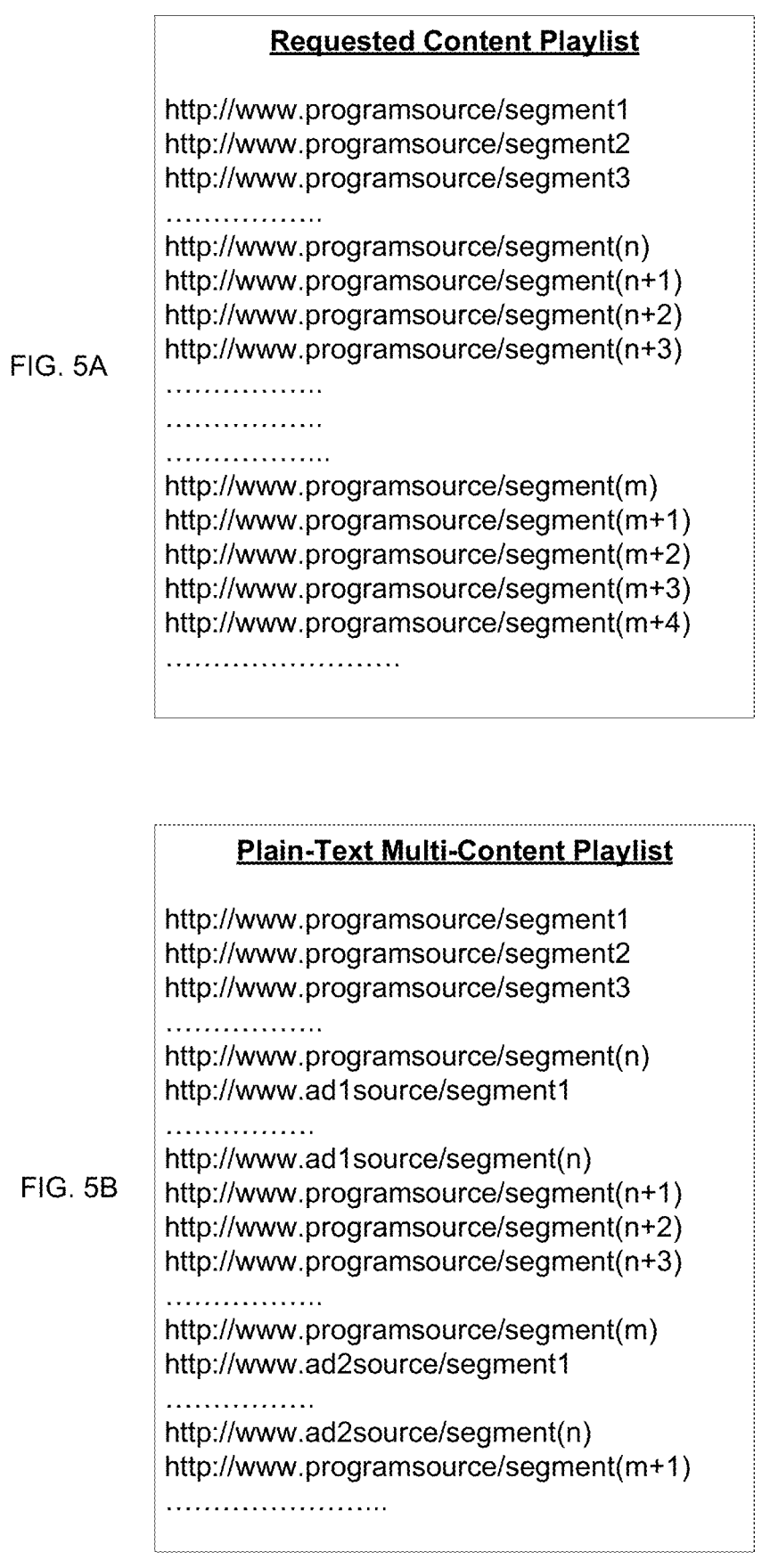

Requested Content Playlist http://www.programsource/segment1
http://www.programsource/segment2
http://www.programsource/segment3
……………..
http://www.programsource/segment(n)
http://www.programsource/segment(n+1)
http://www.programsource/segment(n+2)
http://www.programsource/segment(n+3)
……………..
……………..
………………
http://www.programsource/segment(m)
http://www.programsource/segment(m+1)
http://www.programsource/segment(m+2)
http://www.programsource/segment(m+3)
http://www.programsource/segment(m+4)
……………………

FIG. 5A

Plain-Text Multi-Content Playlist http://www.programsource/segment1
http://www.programsource/segment2
http://www.programsource/segment3
……………..
http://www.programsource/segment(n)
http://www.ad1source/segment1
…………….
http://www.ad1source/segment(n)
http://www.programsource/segment(n+1)
http://www.programsource/segment(n+2)
http://www.programsource/segment(n+3)
……………..
http://www.programsource/segment(m)
http://www.ad2source/segment1
…………….
http://www.ad2source/segment(n)
http://www.programsource/segment(m+1)
……………………

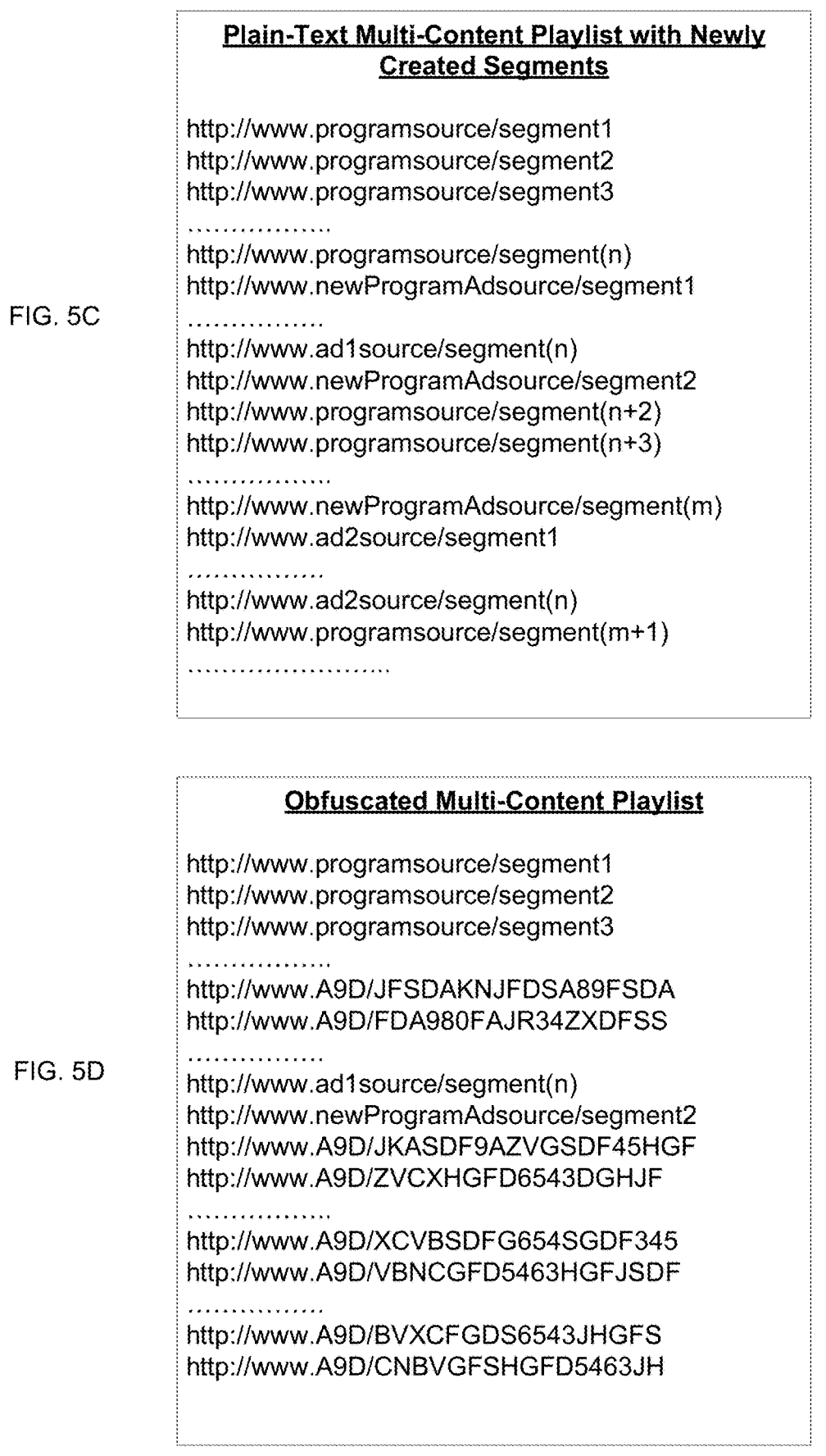

Plain-Text Multi-Content Playlist with Newly Created Segments http://www.programsource/segment1
http://www.programsource/segment2
http://www.programsource/segment3
................
http://www.programsource/segment(n)
http://www.newProgramAdsource/segment1
...............
http://www.ad1source/segment(n)
http://www.newProgramAdsource/segment2
http://www.programsource/segment(n+2)
http://www.programsource/segment(n+3)
................
http://www.newProgramAdsource/segment(m)
http://www.ad2source/segment1
...............
http://www.ad2source/segment(n)
http://www.programsource/segment(m+1)
.......................

FIG. 5D

Obfuscated Multi-Content Playlist http://www.programsource/segment1
http://www.programsource/segment2
http://www.programsource/segment3
................
http://www.A9D/JFSDAKNJFDSA89FSDA
http://www.A9D/FDA980FAJR34ZXDFSS
...............
http://www.ad1source/segment(n)
http://www.newProgramAdsource/segment2
http://www.A9D/JKASDF9AZVGSDF45HGF
http://www.A9D/ZVCXHGFD6543DGHJF
................
http://www.A9D/XCVBSDFG654SGDF345
http://www.A9D/VBNCGFD5463HGFJSDF
...............
http://www.A9D/BVXCFGDS6543JHGFS
http://www.A9D/CNBVGFSHGFD5463JH 601
A segment n
A segment n + 1
A segment n + 2
604
A Segment n + 3
605
B Segment 1
B Segment ...
607
B Segment End
A segment n + 4
A Segment ...
Time (s)

651
A segment n
A segment n + 1
A segment n + 2
654
New A / B Segment
655
B Segment 1
B Segment ...
657
New B / A Segment
A Segment ...
Time (s)

CONTENT PLAYLIST INTEGRITY

CROSS-REFERENCE TO RELATED APPLICATIONS

This application is a continuation of U.S. application Ser. No. 16/149,880, filed Oct. 2, 2018. The above-referenced application is incorporated by reference herein in its entirety.

BACKGROUND

A content provider may authorize download of media (e.g., streaming of video, audio, and/or other types of content) to a playback device. The provider may stream media by sending multiple segments of a media item (e.g., 2-second segments of a television program) and may include advertisements in that stream. Third parties may interfere by removing advertisements from the stream, or may even identify advertisements in the streaming media and replace those with advertisements other advertisements. Removal or replacement of advertisements inserted by the content provider may result in lost revenue by reducing the number of advertisement impressions for which an advertiser would compensate the content provider.

SUMMARY

The following summary presents a simplified summary of certain features. The summary is not an extensive overview and is not intended to identify key or critical elements.

Systems, apparatuses, and methods are described for streaming media using playlists. The playlists may indicate lists of files that a media playback device is to retrieve and play. The playlist may indicate these files by providing network addresses. The filenames may be obfuscated and/or make boundaries between content types (e.g., between request content and advertisements) more difficult to detect. This obfuscation may comprise manipulating file names in the playlist so that content files and advertisement files are similarly-named. Additionally or alternatively, redundancy measures may be used by a playback device to confirm that a received playlist has not been altered. The playback device may be configured to refuse to play content from an altered playlist and/or to notify the content provider of alteration. These and other features and advantages are described in greater detail below.

BRIEF DESCRIPTION OF THE DRAWINGS

Some features herein are shown by way of example, and not by limitation, in the accompanying drawings. In the drawings, like numerals reference similar elements.

FIGS. 5A, 5B, 5C, and 5D show example playlists.

DETAILED DESCRIPTION

Figure 1:
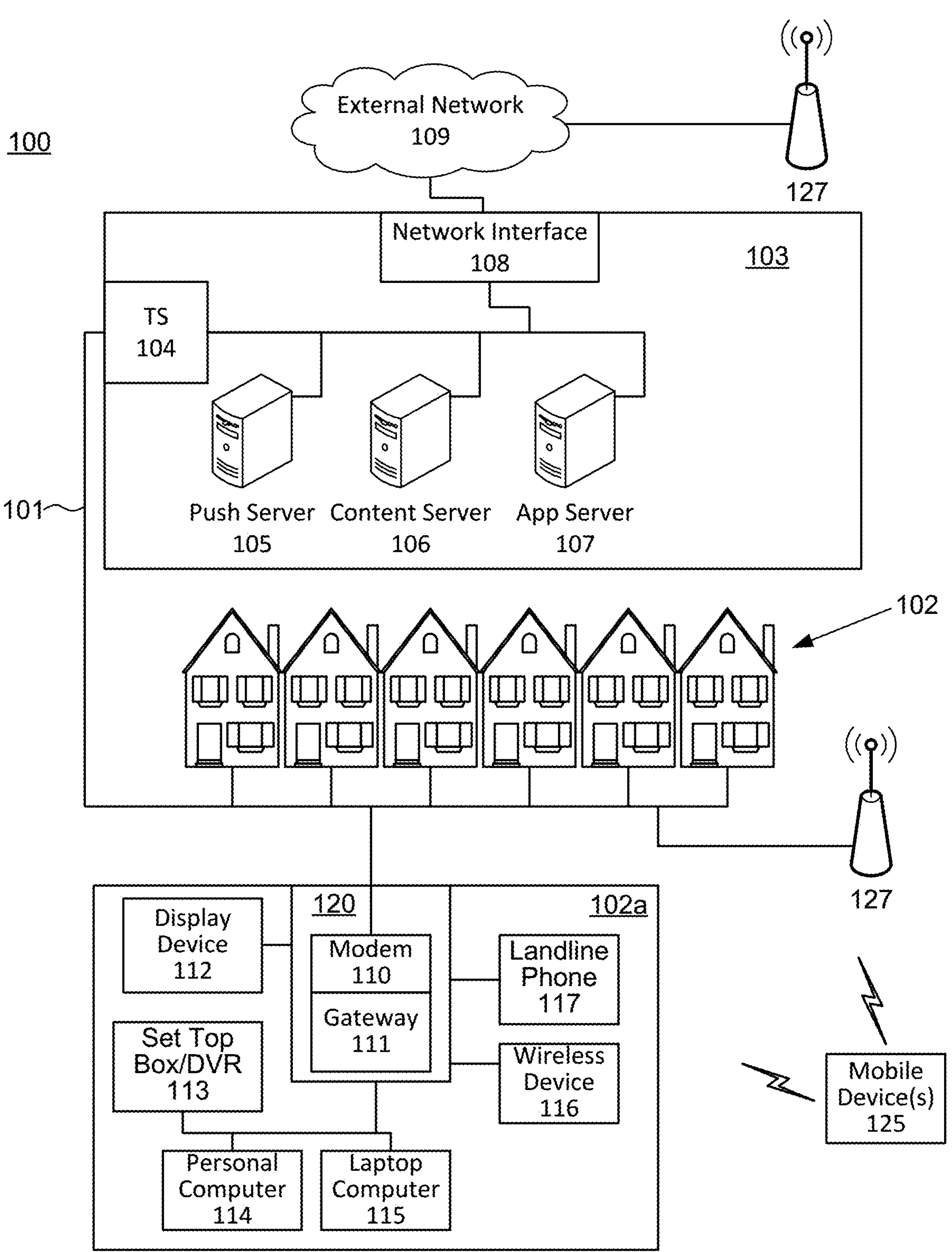
FIG. 1 shows a communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows a communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and backend devices such as the servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being sent to devices in the premises 102 and/or to the mobile devices 125. The local office 103 may comprise additional servers, such as additional push, content, and/or application servers, and/or other types of servers. Although shown separately, the push server 105, the content server 106, the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

The premises 102*a* may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102*a* to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), computer server, and/or any other desired computing device.

The gateway 111 may also comprise one or more local network interfaces to communicate, via one or more local networks, with devices in the premises 102*a*. Such devices may comprise, e.g., the display devices 112 (e.g., televisions), the STBs or DVRs 113, the personal computers 114, the laptop computers 115, the wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), the landline phones 117 (e.g. Voice over Internet Protocol—VoIP phones), and any other desired devices. Example types of local networks comprise Multimedia Over Coax Alliance (MoCA) networks, Ethernet networks, networks communicating via universal serial bus (USB) interfaces, wireless networks (e.g., IEEE 802.11, IEEE 802.15, Bluetooth), networks communicating via in-premises power lines, and others. The lines connecting the interface 120 with the other devices in the premises 102*a* may represent wired or wireless connections, as may be appropriate for the type of local network used. One or more of the devices at the premises 102*a* may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Figure 2:
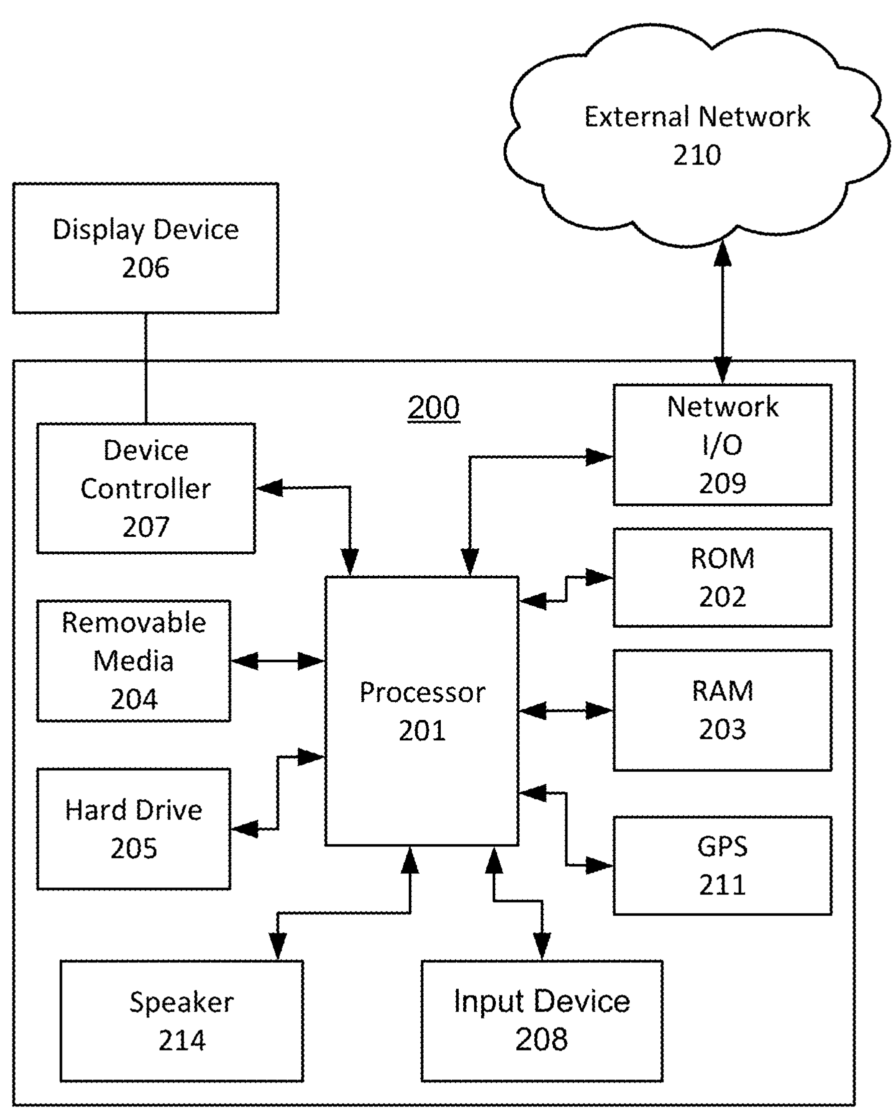
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109) and any other computing devices discussed herein (e.g., a content player). The computing device 200 may comprise one or more processors 201, which may execute instructions of a computer program to perform any of the functions described herein. The instructions may be stored in a read-only memory (ROM) 202, a random access memory (RAM) 203, a removable media 204 (e.g., a Universal Serial Bus (USB) drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 209 (e.g., a network card) to communicate with an external network 210. The network I/O interface 209 may be a wired interface (e.g., electrical, RF (via coax), optical (via fiber)), a wireless interface, or a combination of the two. The network I/O interface 209 may comprise a modem configured to communicate via the external network 210. The external network 210 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows a hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
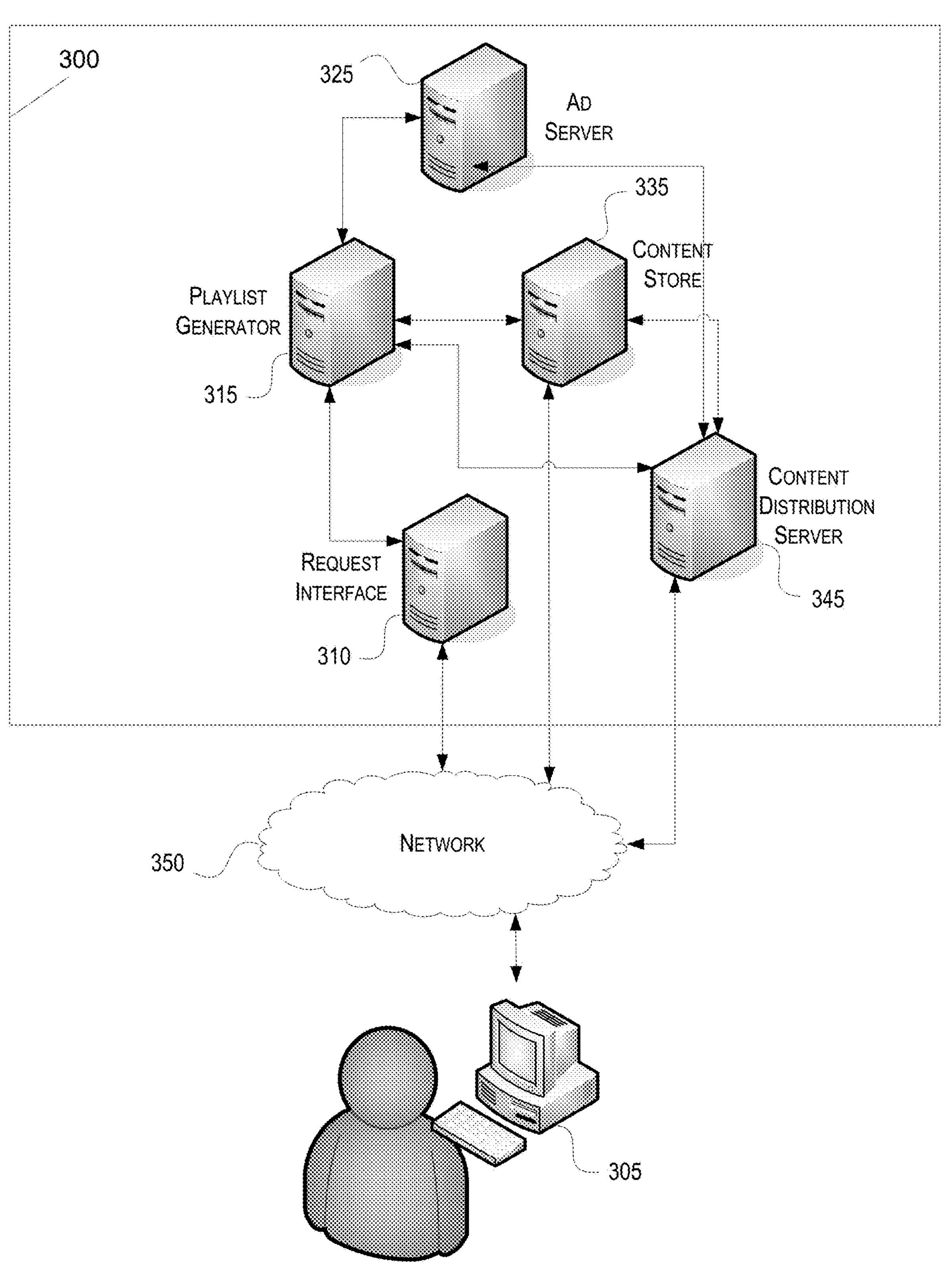
FIG. 3 shows a content delivery network.

FIG. 3 shows a content delivery network that may perform operations described herein. The content delivery network may comprise a content provider 300 that may communicate, via a communication network 350, with a content player 305. The communication network 350 may be, e.g., one of the networks described in connection with FIGS. 1 and 2 (e.g., a network comprising the communication links 101, the external network 109, and/or the external network 209.) The content player 305 may comprise, e.g., a computing device such as one or more of the gateway 111, the display device 112, the set top box/DVR 113, the personal computer 114, the laptop computer 115, the wireless device 116, the mobile device 125, and/or any other computing device. The content provider 300 may comprise a request interface 310, a playlist generator 315, an ad server 325, a content store 335, and/or a content distribution server 345. Although the request interface 310, the playlist generator 315, the ad server 325, the content store 335, and the content distribution server 345 are shown as separate computing devices in FIG. 3, operations described below in connection with these elements may be distributed across more or fewer computing devices in any desired manner. Some or all of these operations may also or alternatively be performed by one or more other computing devices, some of which may be operated by entities other than an entity operating the content provider 300. The request interface 310, the playlist generator 315, the ad server 325, the content store 335 and/or the content distribution server 345 may be, e.g. parts of one or more local offices such as the local office 103 (FIG. 1).

The content player 305 may, in response to a user request for content and/or other user input, generate and send a content request to the content provider 300. The requested content may comprise audio, video, and/or any other type of content. The content request may be received by the request interface 310. The request interface 310 may be a server hosting a web page or other application that may notify content players and/or users about content available for streaming, and may offer to stream the requested content to the content player 305 and/or to other content players.

Based on a received content request, the request interface 310 may notify the playlist generator 315 that a particular content item has been requested. The request interface 310 may also notify the playlist generator 315 of any known characteristics of the user who caused the content request to be made, e.g., a username, age, nationality, native language, gender, interests, viewing history, and/or geographic location, and/or may notify the playlist generator 315 of any known characteristic of the content player 305 or other user device where the content will be displayed, e.g., screen size, connectivity speed, and/or any other information potentially relevant to advertisements to display to the user.

The playlist generator 315 may retrieve the requested content from the content store 335. For example, the playlist generator 315 may send a request for the content items to the content store 335 and, in response, may receive the content items from the content store 335. The content store 335 may be a part of the content provider 300. The content store 335 may also or alternatively be associated with an entity different from an entity operating the content provider 300. The content provider 300 may comprise multiple content stores and/or may have access to multiple content stores operated by other entities.

The playlist generator 315 may determine that the requested content item has been divided into a number of shorter segments and may generate a playlist, such as an HTTP Live Streaming (HLS) playlist, comprising references to each of those shorter segments. A playlist for a requested content item is shown in FIG. 5A. References to advertisements may additionally be inserted into the playlist, as shown in the Plain-Text Multi-Content Playlist shown in FIG. 5B. These advertisements may be dynamically chosen responsive to an individual user, as insertion of the advertisement may be achieved by adding an entry to the playlist, and re-encoding and splicing the advertisement into master content files may be unnecessary. The playlist generator 315 may determine which ads to dynamically insert into the requested content item. Alternatively or additionally, the playlist generator 315 may receive, from the ad server 325 and/or another computing device coupled to the playlist generator 315, a list of ads to insert. Break times, for insertion of the advertisement, may be identified in the content item. Break times may correspond to designated ad breaks, may be designated at regular intervals, and/or may otherwise be determined.

For example, the content provider 300 may offer an episode of a television sitcom for streaming. One or more video files for that sitcom episode may not include ads, e.g., because the ads that were originally included with the episode may be extremely outdated. Based on a user request to stream that episode, the content provider 300 may consult the ad server 325 (and/or a separate advertisement database) to determine one or more advertisements to be inserted into a streaming presentation of the episode. The content provider 300 and/or the ad server 325 may consider information about the user to dynamically select user specific advertisements. The content provider 300 may produce a playlist that identifies various files for the requested content item, and the playlist may comprise one or more embedded entries corresponding to the ads. As shown in FIG. 5B, addresses (e.g., uniform resource locator (URL) addresses, network address, file names, Internet addresses, etc.) for the content item may be noticeably different from addresses for the ad segments, and thus may be easily detectable by a "man-in-the-middle" (MITM), e.g., a third party that may attempt to interfere with a stream of the requested content items and ads selected by the content provider 300. Content from the content store 335, ads from the ad server 325, and the generated playlist from the playlist generator 315 may be sent to the content distribution server 345 to cache and send to the content player 305.

Figure 4:
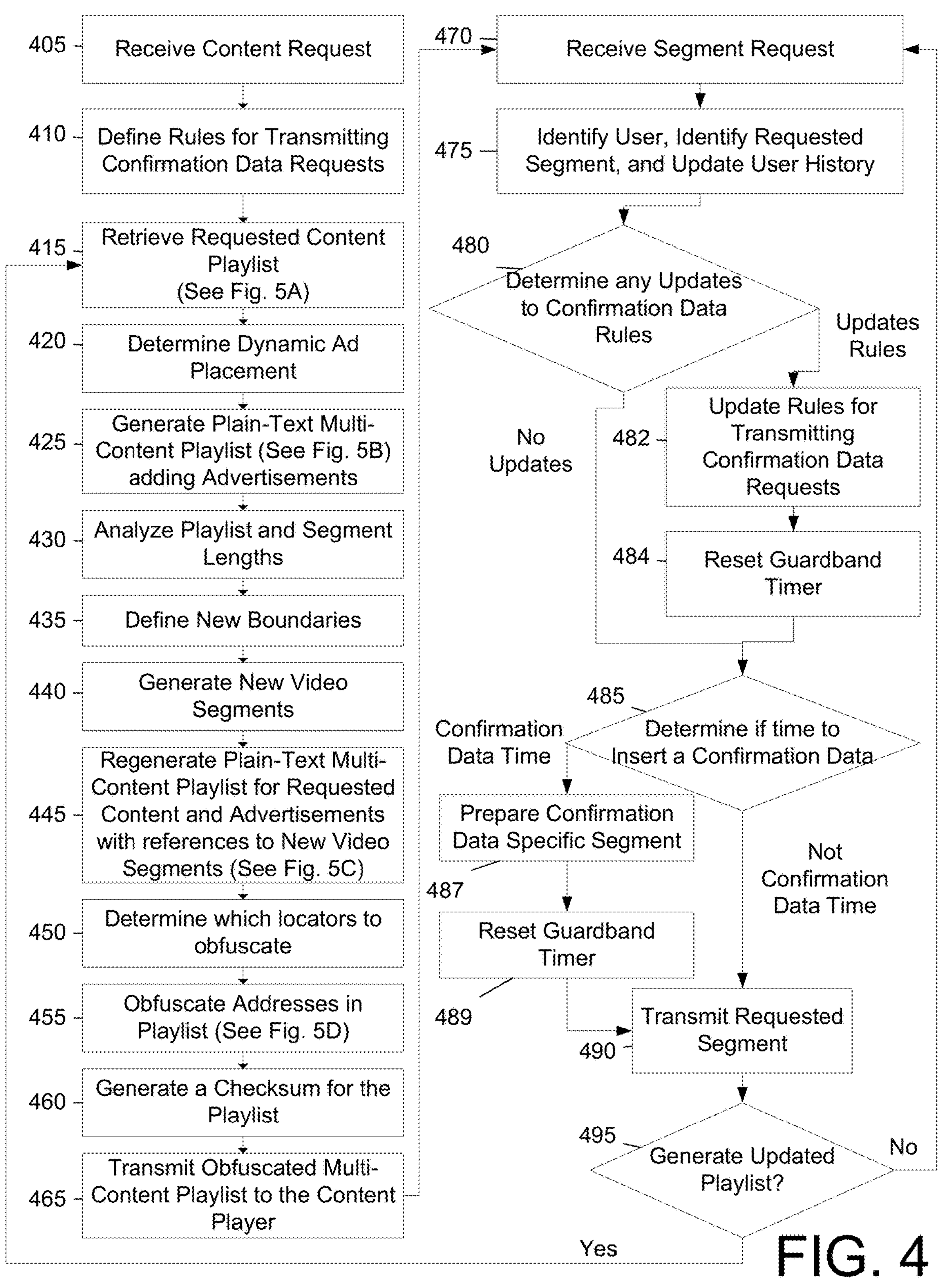
FIG. 4 is a flowchart showing a method for generating playlists.

FIG. 4 is a flowchart showing a method for generating streaming playlists and for sending requested content based on the generated playlists. For convenience, the discussion of FIG. 4 may refer to operations performed by the content provider 300 and/or of elements thereof shown in FIG. 3. Although the operations of FIG. 4 may be performed by one or more of the request interface 310, the playlist generator 315, the ad server 325, the content store 335, and the content distribution server 345, some or all of those operations may be performed one or more other computing devices, which computing devices may be operated and/or otherwise controlled by one or more different entities.

At step 405, a content request for one or more content items may be received. For convenience, FIG. 4 is discussed by example of a request for a first content item that may be a television program. It is understood, however, that the first content item may be any type of content, that a content request may request multiple content items, and that the operations of FIG. 4 may be performed in connection with requests for other types of content items and/or for multiple content items. As described above, a requested content item may comprise video, audio, and/or any other type of content.

The content request received in step 405 may comprise information about a user associated with the content request and/or about a content player to which the requested first content item may be provided. That information may be used for determining one or more additional content items (e.g., ads) to be played with the first content item. For example, any known characteristics of the user who caused the content request to be made, such as a username, age, nationality, native language, gender, interests, viewing history, geographic location, etc., and/or any known characteristic of the content player where the content will be displayed, such as screen size, connectivity speed, etc., or any other potentially relevant information, may be used to determine additional content items. For example, the content request may comprise a user identification (user ID) that may be matched to known characteristics of the user. The known characteristics may have previously been entered by the user and stored by the content provider 300.

At step 410, rules may be defined and/or stored. The rules may be for determining when to send confirmation data, and/or for detecting out of order requests. As explained below, confirmation data may be included with transmission of certain requested content segments. That confirmation data may be used by a content player to verify that the content player is continuing to request and receive content segments corresponding to the correct playlist. As described in more detail below with respect to FIG. 7, if the content player does not receive the confirmation data within an expected time frame and/or within an expected number of requests, or if the content player determines the confirmation data does not match expected confirmation data, the content player may determine a MITM attack has occurred, and initiate an error routine.

The rules may indicate that a first segment with confirmation data should be sent within a certain time period (confirmation data time limit) of receiving a request for a content segment (e.g., within 60 seconds of receiving an initial request for that content segment), and/or that additional content segments with confirmation data must be sent within the confirmation data time limit of sending a previous content segment with confirmation data. A corresponding guard band timer may be initiated to measure the time elapsed since the content player made the initial request for a content segment. Additionally or alternatively, the guard band timer may measure the time elapsed since the playlist was sent, or since the last content segment with confirmation data was sent. Additionally or alternatively, the rules may indicate that the first content segment with confirmation data (and/or subsequent content segments with confirmation data) should be sent within a certain number of content segment transmissions (confirmation data request limit) (e.g., the confirmation data should be sent before the 20th consecutive content segment, and/or at least every 20 content segments). The rules may be defined based on information sent with the content request received in step 405. For example, the content request may comprise information indicating that confirmation data is expected within a certain time period (e.g., a confirmation data time limit), or within a certain number of segments (e.g., a confirmation data request limit). The rules may require that a content segment with confirmation data be sent at least a certain time limit before the confirmation data time limit indicated by the player in the content request received in step 405, or at least a certain number of segments before the confirmation data request limit indicated by the player in the content request received in step 405, to ensure the content player has time to process the confirmation data before the respective limits. For example, if the content request indicated that confirmation data is expected within 60 seconds, the confirmation data time limit may be set to 45 seconds so that the content player may process the confirmation data before the required 60 seconds. Additionally or alternatively, the content player may have accounted for processing time in the information included in the content request.

The confirmation data may comprise a checksum generated for the playlist, a hash identifier, a randomly generated code, or other data that may be used to confirm integrity and/or validity of other data. The confirmation data may comprise information about when the next confirmation data will be sent, so that the content player may determine when it should expect to receive the confirmation data. The confirmation data may comprise a sequence number, so that the content player may detect whether a content segment corresponding to the confirmation data was received out of sequence, indicating one or more segments were removed. The confirmation data may comprise an ad break indicator with information specific to the next ad break such as location, playback order, time, number of segments until the next ad, and/or other identification characteristics specific to the ad content. The ad break indicator may allow the content player to confirm the identified next ad is received, and/or to monitor for the identified next ad at the identified time, and/or to verify that the playlist identifies the correct location, playback order, and/or time for the identified next ad. The confirmation data may be appended to a requested content segment, such as by an ID3 tag to one or more data packets which make up the requested segment. For example, the confirmation data may be embedded in an entertainment transport stream as ID3 tags. The tagged data packets may be protected by digital rights management (DRM) technology to prevent devices other than the requesting content player from decrypting those tagged packets, preventing a MITM from decrypting the packet to read the tags before playing the segment. Additionally or alternatively, the rules may indicate that requests for invalid segments, such as where a MITM attempts but fails to decode an obfuscated URL, may lead to an error routine.

Additionally or alternatively, as part of defining the rules, there may be a determination of the length of time or number of segments corresponding to each advertisement, and/or each continuous play of the first content item. For example, a second ad break may be scheduled eleven minutes after a first ad break. The content provider 300 may define a rule requiring that it receive a request for an advertisement within at most eleven minutes plus a buffer time from receiving a request for a last segment of an advertisement in the first ad break. If the buffer time is, for example, 30 seconds, a request for a segment of an advertisement for the second ad break may be required to be received within eleven minutes and thirty seconds of the request for the last segment of the advertisement in the first ad break. Additionally or alternatively, the content provider 300 may determine how many segments are associated with that eleven minutes, and may require receipt of a request for a segment of the advertisement (for the second ad break) within at most a certain number of segment requests from the request for the last segment of the advertisement in the first ad break, with that certain number being based on the determined number of segments.

At step 415, a copy of a Requested Content Playlist for the first content item may be retrieved. The content provider 300 may have, in connection with previous processing the first content item, divided the first content item into a number of shorter segments (e.g., 2 seconds of content at a time) and encoded those segments as separate media files. The content provider 300 may have stored those files (e.g., at a location accessible by a URL or other address), and may have created a Requested Content Playlist indicating where those files may be found, and in what order they should be retrieved for playback. The Requested Content Playlist retrieved in step 415 may be used to cause the divided segments to be played back in the proper order. Each of the segments may be indicated in the Requested Content Playlist by a reference, e.g., a URL or other address, with that the Requested Content Playlist comprising of a series of references. FIG. 5A shows a Requested Content Playlist. The Requested Content Playlist in FIG. 5A comprises a series of references that point to content segments of a content item. The first address of the Requested Content Playlist (http://www.programsource/segment1) may be an address of a first segment comprising the first two seconds of a content item. The next two seconds of the content item may be in segment two, referenced by the second address of the Requested Content Playlist (http://www.programsource/segment2).

At step 420, one or more segments from one or more additional content items may be inserted into the Requested Content Playlist for playback during playback of the first content item. The one or more additional content items may comprise a second content item that may be an ad. However, the second content item and/or other additional content items need not be an advertisement, and types of content other than ads may be inserted into other content. Segments of the additional content items (e.g. second content item) may be broken into shorter segments. For example, ads may also be encoded into 2-second files by an advertiser, and these files may be stored at different locations, similar to files for segments of other types of content.

The content provider 300 (e.g., the playlist generator 315) may determine which advertisements to dynamically insert into the first content item. Additionally or alternatively, a list of segments to insert from one or more additional content items may be received from another computing device, such as from an ad server. The determination and/or list may indicate an order for the segments of the additional media content item(s) relative to the other segments of the first content item. Segments of the additional media content item(s) may be inserted between the content segments at designated locations (e.g., ad breaks) or at regular intervals. The segments from the additional content item(s) may come from a different domain than a domain hosting the first content item. For example, segments of the first content item may be located at an address referenced as "programsource," and the playlist may reference those segments as seen in FIG. 5A. Segments of the second content item may be located at an address referenced as "ad1source," and the playlist may reference those segments as seen in FIG. 5B (described below). Advertisement (or another type of additional content item) selection and placement may be based on the first content item, information about the user, information about the content player that will play the first content item, and/or any other relevant information.

Figures 6A, 6B:
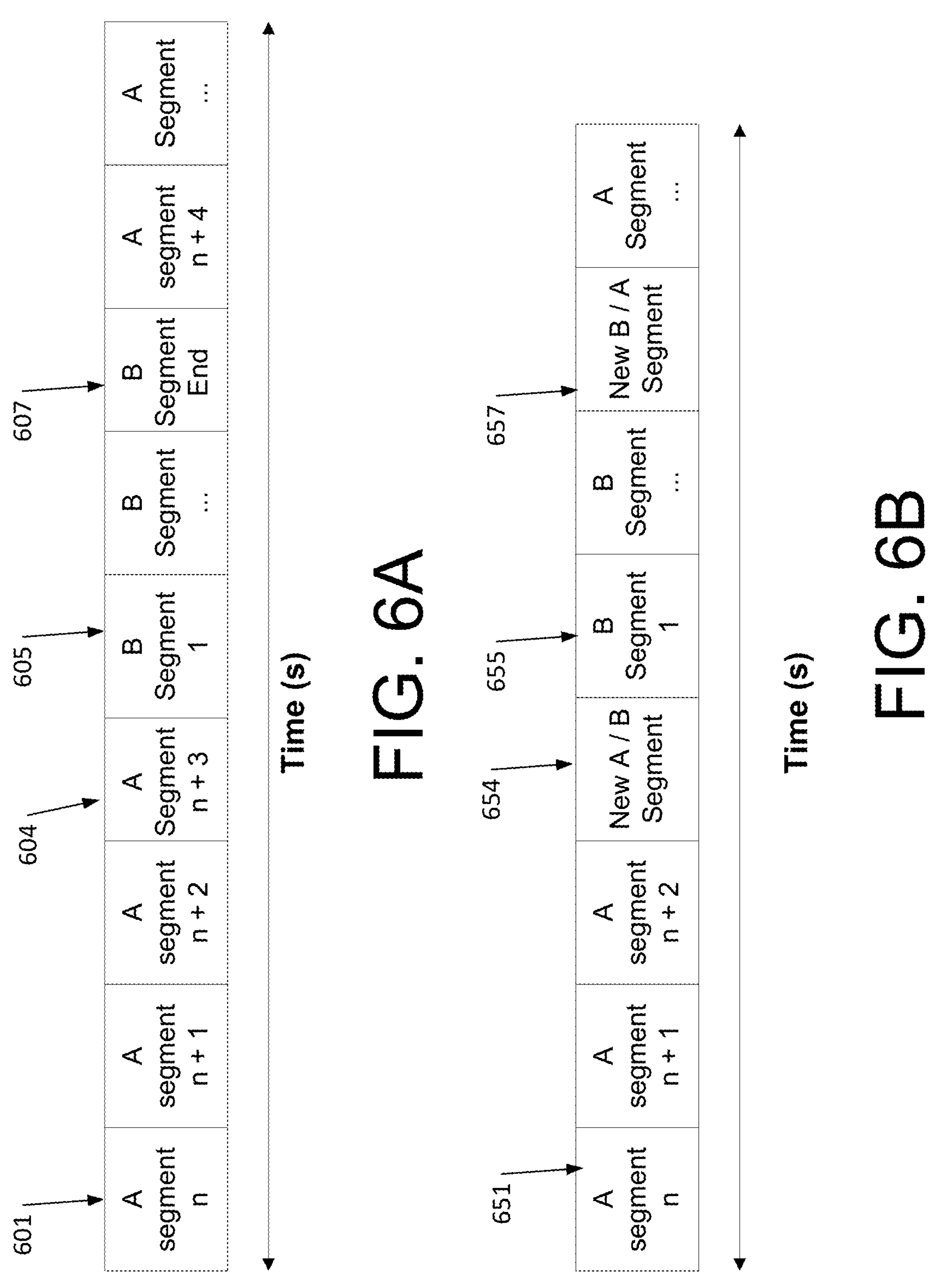
FIGS. 6A and 6B show examples of content segment boundaries.

At step 425, the Requested Content Playlist may be modified by inserting addresses of the additional content item segments at the desired locations in the playlist, resulting in a user playlist comprising references to both the first content item and the additional content item(s) as determined at step 420. References may be URL addresses or other locators to the individual segments of the first content item and the additional content item(s). A user playlist is shown in FIG. 5B. At step 430, the playlist and content segments referenced therein may be analyzed to determine if the content segments have a typical length, and if any content segments have a length distinct from a typical length for the playlist. For example, if the first content item is divided into two-second segments, but a portion of the first content item before an ad break has a length of ten minutes and one second, the last segment of the first content item may only be one-second long instead of the typical two seconds. Similarly, an advertisement of twenty-seven and a half seconds may have an irregularly-sized segment at the end (if 2-second files are the norm). FIG. 6A shows example segments of content item A having a standard length that is the same as A Segment n (601). The last segment before a segment of the content item B, A Segment n+3 (604) may have a shorter length. Likewise, while segments of content item B, such as B Segment 605, may have the same standard/typical length, the last B Segment 607 may be a shorter length. The content provider 300 may determine that most segments have a default segment length and/or a default segment size, and may identify specific segments having a length that is different from the default segment length and/or segments having a size that is different from the default segment size.

Segment lengths and/or size may be relevant because a potential MITM attacker may analyze the length of the segments as they are sent to a content player, and may identify a shorter segment as a transition point from a requested content item to advertisement content. If the MITM observed ten minutes of uniform length segments followed by a shorter segment length, for example, the MITM may determine that the next segment after the shorter-length segment corresponds to an advertisement. The MITM could continue to intercept segments of that advertisement until the next shorter length segment, which may identify it as a transition from the advertisement back to the requested content. Based on the identified advertisement segments, the MITM could take unauthorized actions such as removing the advertisement and/or replacing the advertisement with a different advertisement or with other content.

At step 435, to prevent an MITM attacker from analyzing the content segments to determine long periods of time between irregularly-sized segments and infer that these long periods are requested content, new boundaries may be defined so that content segments in the playlist have uniform, or more uniform, lengths. A buffer duration may be determined, so that all segments may be within a buffer duration of the uniform length (e.g., if the uniform length is 2 seconds, and the buffer duration is 0.1 seconds, all segments may be 1.9 to 2.1 segments). The new boundaries may be defined to so that all segments or most segments (e.g., all segments except for the very last segment) have a common duration or size, including segments before an ad breaks. The common duration or size may be determined based on the analysis of the original media segments at step 430. This may result in segments that combine content items. For example, creating a new content segment file that is 2 seconds in length may result in one second of a one type of content (e.g., a television episode) and a first second of another type of content (e.g., an advertisement). The content provider 300 may continue to analyze the duration and/or size of each consecutive segment of content identified by a playlist, and continue to define new boundaries, until it determines that, each segment is the uniform length (or at least within the buffer duration of the uniform length), or that the next segment is the last segment of the playlist.

At step 440, new segments may be generated based on the defined boundaries from step 435. The original segments may be decoded and re-encoded to form new segments having the default segment size or the default segment length. Some of the new segments may incorporate both the first content item and the second content item. For example, referring to FIG. 6B, instead of a shorter item A segment 604, a new A/B segment 654 may be created that comprises, for example, one-second of content item A along with a second of the content item B. As may be appreciated, the A/B segment may comprise a different ratio between the content items, depending, e.g., on where an ad break for the content item B was inserted. Similarly, instead of the shorter item B segment 607 (FIG. 6A), a new B/A segment 657 may be created. All segments following the A/B segment 654 may be re-encoded to correct program clock reference (PCR) errors that may be introduced by merging two video segments. The newly created segments may be stored at a content database, and new locating references may be created. At step 445, the user playlist may be regenerated to comprise references to the new media segments created at step 440, as well as references to the first content item and the second content item, as can be seen in FIG. 5C.

Some or all of the segment file names in the playlist may be altered so that an MITM reviewing the playlist would have difficulty determining when advertisements or other content types begin or end. As shown in FIGS. 5B and 5C, the addresses of the first content item (from the "program-source" domain) may be distinguishable from the addresses of the second content item (from the "ad1source" domain) and of other content items (from the "a2source" domain) based on different domain names. An MITM may be able to block and/or replace all content not from the "program-source" domain, for example. At step 450, there may be determination of which references to obfuscate. Some or all references may be obfuscated. Obfuscating select references instead of all references may be advantageous, as it may require fewer resources (e.g., of the content distribution server 345) to decode the obfuscated addresses received in a request for a segment. One or more methods for determining which references to obfuscate may be used.

For example, references to advertisement content may be obfuscated to comprise alphanumeric strings similar to those in the addresses of the requested content. The content provider 300 may determine which references correspond to content items (e.g., advertisements) other than the first content item, and may select those references for obfuscation. The content provider 300 may obfuscate those references by replacing the references so that they comprise an alphanumeric string common to the first content item. References to the requested content may remain unchanged.

Additionally or alternatively, some or all of the references to the first content item may be obfuscated to comprise a domain address of the second content item or of other content items for which there are segments references in the playlist, or to comprise a domain name different from other domain names in the playlist. The content provider 300 may determine which references correspond to the first content item, and may select those references, or a portion of them for obfuscation. For example, the content server may choose to obfuscate references for a certain number of consecutive segments, such as 20 consecutive segments, of the first content item. Additionally or alternatively, references for a percentage of the first content item segments (e.g., 10%) may be and randomly selected for obfuscation. The randomly selected references may be obfuscated by, for each selected reference, replacing the reference to the first content item with a new reference. References that were not selected may remain unchanged.

Additionally or alternatively, references at boundaries between the first content item and other content items may be obfuscated. The content provider 300 may determine a boundary between the first content item and the second content item, e.g., a point in the playlist where an address of the first content item is followed by an address of the second content item, and may select those neighboring segments at that boundary, and one or more additional segments before and after those neighboring segments (e.g., a threshold range of segments surrounding the boundary), for obfuscation. Doing so may leave other, unselected segments unobfuscated. URL obfuscation may allow random placement of the confirmation data. Regional discontinuities may hide advertisement locations.

At step 455, an Obfuscated Multi-Content Playlist may be generated by replacing selected references in the Plain-Text Multi-Content Playlist (e.g. FIG. 5B) or Plain-Text Multi-Content Playlist with Newly Created Segments (e.g. FIG. 5C) with obfuscated references having a uniform format and/or coming from the same domain, as determined at step 450. Obfuscated addresses may be created by generating a random alphanumeric string. Additionally or alternatively, keywords that may hint at the nature of the content may be identified and replaced. For example, content provider 300 may examine addresses for content segments to identify strings of characters that appear in more than a threshold of the addresses. The threshold may be defined as a number of addresses, a number of consecutive addresses, and/or by the percentage of total addresses. For example, referring to FIG. 5B, if the content provider 300 determines that over 50% of the addresses comprise "program," the content provider 300 may determine that string of characters identifies the nature of the content, and may obscure the selected addresses by changing the word "program" to some other string or strings. Additionally or alternatively, if the content provider 300 determines that 12 consecutive addresses comprise the string "ad1," the content provider 300 may determine that string of characters identifies the nature of the content, and may avoid using "ad1" in the new address references. Additionally or alternatively, if the content provider 300 determines that a percentage of the advertisements comprise the same string of characters, such as "ad1", the content provider 300 may generate a masking address for the requested content that also comprises that string of characters (i.e. "ad1"). Additionally or alternatively, the content provider 300 may generate random URLs. The obfuscated URLs may incorporate a hashed value, a sequential numerical index (such as "00001", "00002", etc.), a randomly chosen alphanumeric value, or another value with no discernible connection to the content it references. A Obfuscated Multi-Content Playlist is shown in FIG. 5D. Obfuscation may comprise generating a masking address corresponding to each address or other reference, and/or obscuring whether the masking address refers to a segment of the first content item or to a segment of the second content item or of other content items, and replacing the original addresses or other references with the masking addresses in the playlist.

At step 455, the content provider 300 may also determine how the obfuscated addresses will be handled for requests made for segments based on those obfuscated addresses. A lookup table may be created and stored to use for decoding obfuscated values received in a request for a segment. Based on a decoded address, the content segment may be obtained from the original address and returned in response to the request for that segment. As discussed above with respect to step 450, obfuscating select references may be advantageous so that a server may handle fewer requests to decode obfuscated addresses.

At step 460, before sending the Obfuscated Multi-Content Playlist generated at step 455 to the content player, a checksum of the generated playlist may be determined. That checksum may be used by the payback device to verify that a playlist received by the content player is the same playlist sent by the content provider 300. A Message Digest 5 (MD5) checksum may be used. The checksum may be determined by a cryptographic hashing function. The checksum generated may be sent separate from the playlist, as part of the confirmation data. For example, the checksum may be embedded in an entertainment transport stream as an ID3 tag sent with a content segment at a different time than the playlist, following a content request from the content player, as indicated in the rules at step 410. At step 465, the Obfuscated Multi-Content Playlist may be sent to the content player.

The content provider 300 may begin receiving segment requests from the content player, for individual segments of content, that comprise addresses from the Obfuscated Multi-Content Playlist. At step 470, a segment request may be received. At step 475, a user associated with the segment request, and requested segment, may be identified, and a user history may be updated. The user may be identified, for example, by the address in the segment request indicating where the requested segment is to be sent. The user history may comprise the number of segments sent since the last confirmation data was sent, the segment requests made over a certain time period, and/or a certain number of the most recent segment requests, such as the last segment request, or the last 5, 10, or 50 segment requests. The user history may be used, for example, if the rules for sending confirmation data requests indicate confirmation data should be sent based on a confirmation data request limit, and/or if rules were defined for detecting out of order requests based on segments that have been previously requested, e.g., rules requiring a request for an advertisement after a certain period of time or number of segment requests.

At step 480, the content provider 300 may determine if there are any updates to the rules for when to send the next confirmation data segment. For example, a segment request may have comprised additional information about when the content player expects to receive the next confirmation data segment, such as by providing a new or updated confirmation data time limit or confirmation data request limit. If there are updates to the rules, at step 482, the rules may be updated, such as by updating the confirmation data time limit or confirmation data request limit. If the confirmation data time limit was updated, at step 484, the guard band timer may be reset.

At step 485, the content provider 300 may determine it is time to insert confirmation data into the requested segment. The content provider 300 may determine it is time to insert the confirmation data if the guard band timer indicates the confirmation data time limit has expired. Additionally or alternatively, the content provider 300 may determine it is time to insert the confirmation data if the user history indicates the confirmation data request limit has been met or exceeded. Additionally or alternatively, even if the confirmation data time limit and confirmation data request limit have not expired, the content provider 300 may randomly determine it is time to insert a confirmation value, such as through use of a random number generator. If it is not time to insert the confirmation data, the method proceeds to step 490.

If it is time to insert a confirmation data, the content provider 300 may prepare a confirmation data specific segment at step 487. The content provider 300 may embed data into the transmission of a confirmation data specific segment, or of other segments, by appending a data container, such as an ID3 tag, to one or more data packets that make up the requested segment. The tag may comprise information about the data packets, such as the length of frames, length of payload, etc., and may allow this information about the file to be stored in the file itself. The tag may further comprise identifying information about the segment, such as the corresponding address or masking address from the playlist, so that the content player may use the playlist to determine the content is played in the correct order. For a confirmation data specific segment, the tag may further comprise the determined checksum for the generated playlist, a generated hash identifier, a randomly generated code, or other data that may be used to confirm integrity and/or validity of other data, and/or may comprise any other type of confirmation data. The confirmation data may comprise the checksum generated at step 460.

The data container (e.g. ID3 tag) may also comprise data about when the next confirmation data specific segment will be sent, such as a new confirmation data time limit and/or confirmation data request limit. The new confirmation data time limit and/or confirmation data request limit may be randomly generated. The tagged data packets may be protected by digital rights management (DRM) technology, which may prevent devices other than the content player from decrypting those packets, preventing a MITM from decrypting a packet to read the tags before playing the segment. This DRM encryption may be accomplished via a protocol or method that is robust in the face of insecure channels, such as secure sockets layer (SSL) or a protocol based on Diffie-Hellman key exchange. If transmission of the confirmation data was based, at least in part, on a confirmation data time limit, at step 489, the guard band timer may be reset.

At step 490, the requested segment may be sent to the content player. The requested segment may be DRM encrypted prior to being sent. At step 495, the content provider 300 may determine if a new playlist should be generated. In some situations, the playlist may be evolving. For example, to facilitate streaming content, an initial playlist may indicate a playback order for a first portion of a content item, such as for the first few minutes of content, for content up until, or through, a first advertisement, and/or for a first number of segments. The playlist may be frequently updated with a next portion of the content item, a new checksum generated for each updated playlist, and updated playlists sent to the content player, such as described with respect to steps 415-465. If the playlist is not to be updated, or after the updated playlist is sent to the player, the content provider 300 may continue to receive segment requests and send requested segments, as described with respect to steps 470-490. One or more additional steps (not shown) may be included between step 495 and step 470 to terminate the method if, e.g., an end of a playlist is reached.

Figure 7:
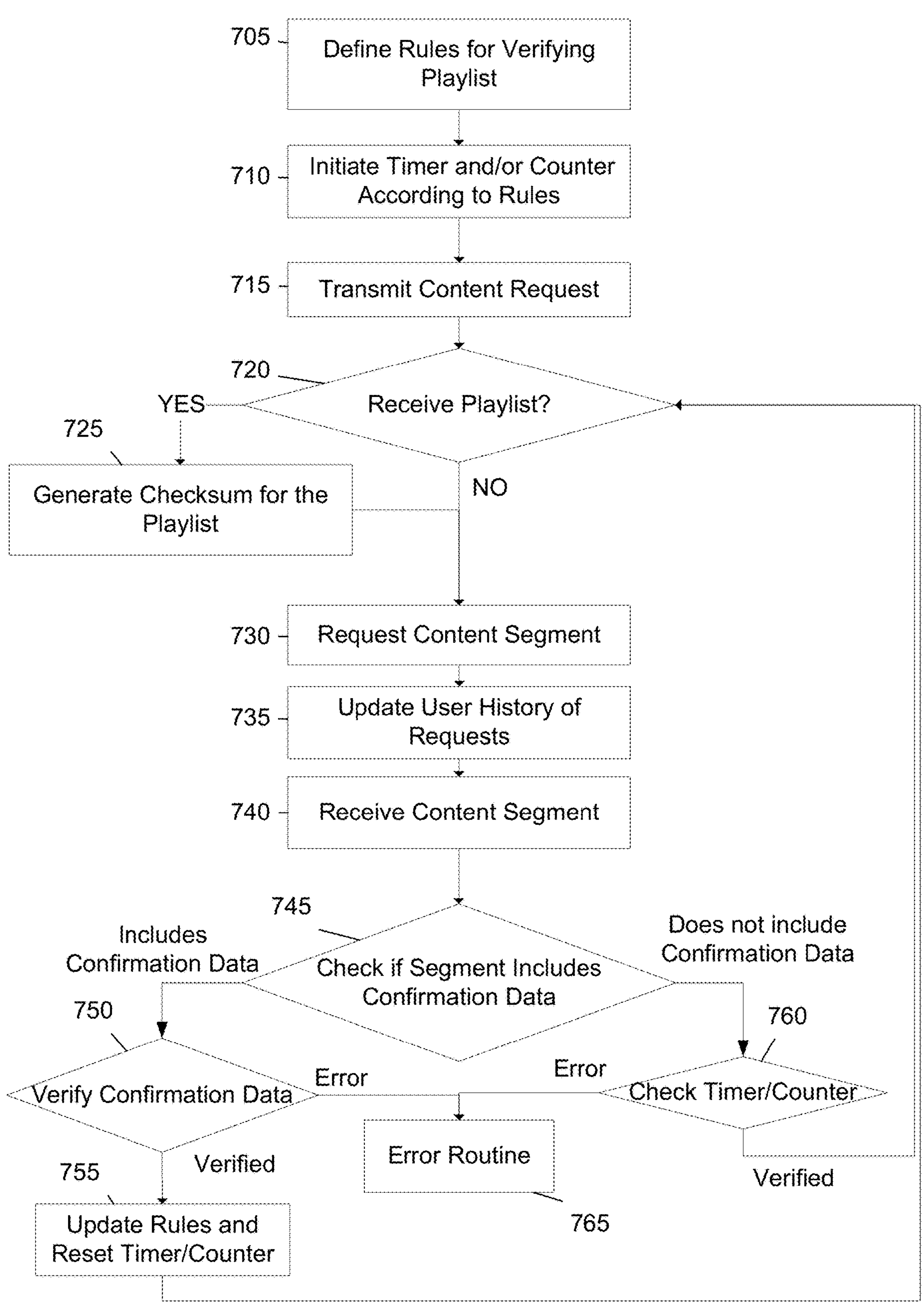
FIG. 7 is a flowchart showing a method for determining playlist alteration.

FIG. 7 is a flow chart showing a method for determining playlist alteration. For convenience, the example method of FIG. 7 is discussed using the example of the content player 305 performing various steps. However, the operations of FIG. 7 may be performed by one or more other computing devices.

The content player 305 may perform steps to attempt to detect an MITM attack. At step 705, rules may be defined for catching out of order requests, and a rules file may be stored. The rules may define when the content player 305 expects to receive confirmation data, such as a confirmation data time limit and/or a confirmation data request limit. For example, if the confirmation data request limit is 20, the content player 305 may expect to receive confirmation data within 20 segment requests of the last segment that comprised confirmation data. As an additional or alternative example, if the confirmation data time limit is defined as 20 seconds, the content player 305 may expect to receive confirmation data within 20 seconds of a last segment that comprised confirmation data. Additionally or alternatively, the content player 305 may define a rule to include a request for confirmation data with its segment requests, and the limits may be measured from the time the content player 305 makes segment requests.

At step 710, the content player 305 may initiate a timer and/or counter according to the rules as defined at step 705. If a confirmation data time limit was defined, a corresponding timer may be initiated and started. If a confirmation data request limit was defined, a corresponding counter may be initiated.

At step 715, the content player 305 may send a content request. This request, which may be received by content provider 300 in step 405 of FIG. 4, may indicate what content item is requested. The content request may also comprise data about the rules defined at step 705. The content player 305 player may place, in the content request, data indicating that confirmation data should be sent within the confirmation data time limit, and/or within the confirmation data request limit number of requests. Additionally or alternatively, the content player 305 may send a time limit or request limit that is less than the confirmation data time limit, or confirmation data request limit, so that the content player 305 is more likely to have sufficient time to process the confirmation data before the corresponding limit expires.

At step 720, the content player 305 may receive a playlist for the requested content item. The playlist may identify, for example, sequential lists of files that the content player 305 is to retrieve and play. The playlist may be the Obfuscated Multi-Content Playlist generated and sent at steps 455 and 465 of FIG. 4. If the content player 305 receives a playlist, at step 725 it may generate a checksum for the playlist.

At step 730, the content player 305 may request the next content segment from the playlist. The segment request may additionally comprise a request for confirmation data, and a corresponding confirmation data time limit and/or confirmation data request limit, according to the rules. For example, if the content player 305 is making segment requests in the form of HTTP Requests, the content player 305 may use a header field of the HTTP Request to also comprise the additional information requesting confirmation data. If the segment request comprises a request for confirmation data, the content player 305 may restart the timer and/or counter to correspond with the new confirmation data request.

At step 735, the content player 305 may update the history of requests. For example, the content player 305 may track which content segment the playlist indicates it should request next. Additionally or alternatively, if a counter was started, the content player 305 may update the counter to indicate how many segments have been requested since the last received confirmation data.

At step 740, the content player 305 may receive the requested content segment. The content segment received at step 740 may be passed for further processing (e.g. by a separately executing process) for decoding or causing to be presented on a display.

At step 745, the content player 305 may check to see if the requested content segment comprises confirmation data. The confirmation data may be appended to the requested segment, such as by an ID3 tag to one or more data packets which make up the requested segment. For example, the confirmation data may be embedded in an entertainment transport stream as ID3 tags. The tagged data packets may be protected by digital rights management (DRM) technology to prevent devices other that the content player from decrypting those tagged packets, preventing a MITM from decrypting the packet to read the tags before playing the segment.

If the segment comprises confirmation data, at step 750 the content player 305 may verify that the confirmation data comprises the expected data. For example, the confirmation data may comprise the server-generated checksum for the playlist that was received at step 720. The content player 305 may compare the received checksum to the checksum it generated at step 725. If the received checksum does not match the calculated checksum, the error routine 765 may be performed. If the received confirmation data matches the expected response, the content player 305 may, at step 755, also check if the confirmation data comprises information about when the next confirmation data will be sent, such as an updated confirmation data time limit and/or confirmation data request limit. At step 755, the content player 305 may additionally or alternatively reset the timer and/or counter according to the applicable confirmation data time limit and/or confirmation data request limit.

Additionally or alternatively, at step 750, the content player 305 may determine if the confirmation data comprises a sequence number. The content player 305 may determine an expected sequence number for the segment based on the playlist order and/or based on a counter corresponding to the number of received segments. The content player 305 may compare the received sequence number to the expected sequence number. If it does not match, the error routine 765 may be performed.

Additionally or alternatively, at step 750, the content player 305 may check if the confirmation data comprises an ad break indicator with information specific to the next ad break. The content player 305 may verify that the playlist identifies the correct location, playback order, and/or time for the identified next ad. The content player 305 may additionally or alternatively monitor future segments for the identified next ad. For example, if the ad break indicator indicates a time for the identified next ad, and the content player 305 does not receive an ad within the indicated time, the error routine 765 may be performed. As another example, if the ad break indicator indicates a number of segments until the identified next ad, and the content player 305 does not receive an ad within the indicated number of segments, the error routine 765 may be performed. The content player 305 may continue to check for updated playlists, and to request and process content segments at steps 720-765.

At step 745, if the segment request does not comprise confirmation data, the content player 305 may, at step 760, determine that a certain period of time has passed, and/or that a certain number of segments have been requested, without receiving the confirmation data. If too much time has passed without receipt of confirmation data, indicated by the timer exceeding the confirmation data time limit, and/or if too many segments have been requested without receipt of the confirmation data, indicated by the counter exceeding the confirmation data request limit, this may indicate that the playlist has been altered or that ad-blocking software is preventing and/or blocking retrieval or playback of advertisements or other content in the intended playlist. The content player 305 may respond by performing an error routine at step 765. If the confirmation data time limit and/or the confirmation data request limit are not exceeded, the content player 305 may continue to check for updated playlists at step 720, and continue to request and process content segments as described for steps 730-765.

The error routine 765 may depend, for example on whether it is a first time the content player 305 did not receive the confirmation data within the defined time limits or request limits, and/or that the confirmation data comprised a mismatched checksum. A single failure may suggest a problem with the transmission of data unrelated to a MITM attack. After multiple failures, e.g., the content player 305 may respond by ending the stream and/or preventing further display of media segments. Alternatively or additionally, the content player 305 may cause a media display device to display an error message or otherwise notify a user that ads or other intended content have been inappropriately removed and that content will be unavailable or reduced in some manner if ad-blocking continues. One or more additional steps (not shown) may be included between step 745 and step 720 to terminate the method if, e.g., an end of a playlist is reached.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

We claim:

1. A method comprising:

sending, by a computing device, a playlist indicating a playback order of a plurality of segments of a content item;

receiving one or more requests for the plurality of segments;

sending the plurality of segments, wherein one or more of the plurality of segments omits, based on one or more rules, confirmation data usable to verify the plurality of segments before output; and causing, based on determining that no confirmation data is included in a segment of the content item and that an amount of time has elapsed following reception of confirmation data associated with the content item, an error routine.

2. The method of claim 1, wherein the one or more rules indicate a time limit for embedding confirmation data, and the method further comprises:

selecting segments, among the plurality of segments based on the time limit; and embedding confirmation data in the selected segments.

3. The method of claim 1, wherein the one or more rules indicate a threshold quantity of segments for embedding confirmation data, and the method further comprises:

selecting segments, among the plurality of segments, based on the threshold; and embedding confirmation data in the selected segments.

4. The method of claim 1, further comprising receiving a request for a segment of the plurality of segments, wherein the sending the plurality of segments comprises sending the segment based on receiving the request.

5. The method of claim 1, wherein a first segment comprising confirmation data further comprises an indication of a time of transmission of a next segment comprising confirmation data.

6. The method of claim 1, wherein the plurality of segments of the content item comprise:

segments of requested content; and segments of one or more advertisements.

7. The method of claim 1, further comprising generating the plurality of segments, wherein the segments are associated with substantially equal time portions of the content item.

8. The method of claim 1, further comprising:

determining the amount of time that has elapsed by counting the one or more requests for the plurality of segments following reception of confirmation data associated with the content item.

9. A method comprising:

sending, by a computing device based on a playlist, one or more requests for a plurality of segments of a content item;

receiving the plurality of segments, wherein at least one of the plurality of segments omits, based on one or more rules, confirmation data;

based on verifying one or more of the plurality of segments using confirmation data, causing output, via a visual display device, of the one or more of the plurality of segments in a playback order indicated by the playlist; and based on determining that no confirmation data is included in a segment of the content item and that an amount of time has elapsed following reception of confirmation data associated with the content item, causing sending of an error message.

10. The method of claim 9, further comprising:

generating confirmation data for the playlist, wherein the verifying one or more of the plurality of segments comprises determining that the generated confirmation data matches received confirmation data.

11. The method of claim 9, further comprising:

decrypting a segment of the plurality of segments; and determining that confirmation data is embedded in a data tag of the segment.

12. The method of claim 9, further comprising sending a request indicating the amount of time.

13. The method of claim 9, wherein a selected segment of the content item comprises an indication of the amount of time.

14. The method of claim 9, further comprising:

generating second confirmation data for an updated playlist for the content item;

receiving a second plurality of segments of the content item; and based on the second confirmation data matching third confirmation data associated with the received second plurality of segments, causing output of the second plurality of segments in an updated playback order indicated by the updated playlist.

15. The method of claim 9, further comprising:

generating second confirmation data for an updated playlist for the content item;

receiving a second plurality of segments of the content item; and based on the second confirmation data not matching third confirmation data associated with the received second plurality of segments, causing sending of an error message.

16. An apparatus comprising:

one or more processors; and memory storing instructions that, when executed by the one or more processors, cause the apparatus to:

send a playlist indicating a playback order of a plurality of segments of a content item;

receive one or more requests for the plurality of segments;

send the plurality of segments, wherein one or more the plurality of segments omits, based on one or more rules, confirmation data usable to verify the plurality of segments before output; and cause, based on determining that no confirmation data is included in a segment of the content item and that an amount of time has elapsed following reception of confirmation data associated with the content item, an error routine.

17. The apparatus of claim 16, wherein the one or more rules indicate a time limit for embedding confirmation data, and wherein the instructions, when executed by the one or more processors, cause the apparatus to:

select segments, among the plurality of segments, based on the time limit; and embed confirmation data in the selected segments.

18. The apparatus of claim 16, wherein the one or more rules indicate a threshold quantity of segments for embedding confirmation data, and wherein the instructions, when executed by the one or more processors, cause the apparatus to:

select segments, among the plurality of segments, based on the threshold; and embed confirmation data in the selected segments.

19. The apparatus of claim 16, wherein the instructions, when executed by the one or more processors, cause the apparatus to:

receive a request for a segment of the plurality of segments, and send the plurality of segments by causing sending the segment based on receiving the request.

20. The apparatus of claim 16, wherein a first segment comprising confirmation data further comprises an indication of a time of transmission of a next segment comprising confirmation data.

21. The apparatus of claim 16, wherein the plurality of segments of the content item comprise:

segments of requested content; and segments of one or more advertisements.

22. The apparatus of claim 16, wherein the instructions, when executed by the one or more processors, cause the apparatus to generate the plurality of segments, wherein the segments are associated with substantially equal time portions of the content item.

23. An apparatus comprising:

one or more processors; and memory storing instructions that, when executed by the one or more processors, cause the apparatus to:

send, based on a playlist, one or more requests for a plurality of segments of a content item;

receive the plurality of segments, wherein at least one of the plurality of segments omits, based on one or more rules, confirmation data;

based on verifying one or more of the plurality of segments using confirmation data, cause output, via a visual display device, of the one or more of the plurality of segments in a playback order indicated by the playlist; and based on determining that no confirmation data is included in a segment of the content item and that an amount of time has elapsed following reception of confirmation data associated with the content item, causing sending of an error message.

24. The apparatus of claim 23, wherein the instructions, when executed by the one or more processors, cause the apparatus to:

generate confirmation data for the playlist; and verify the one or more of the plurality of segments by causing determining that the generated confirmation data matches received confirmation data.

25. The apparatus of claim 23, wherein the instructions, when executed by the one or more processors, cause the apparatus to:

decrypt a segment of the plurality of segments; and determine that confirmation data is embedded in a data tag of the segment.

26. The apparatus of claim 23, wherein the instructions, when executed by the one or more processors, cause the apparatus to send a request indicating the amount of time.

27. The apparatus of claim 23, wherein a selected segment of the content item comprises an indication of the amount of time.

28. The apparatus of claim 23, wherein the instructions, when executed by the one or more processors, cause the apparatus to:

generate second confirmation data for an updated playlist for the content item;

receive a second plurality of segments of the content item; and based on the second confirmation data matching third confirmation data associated with the received second plurality of segments, cause output of the second plurality of segments in an updated playback order indicated by the updated playlist.

29. The apparatus of claim 23, wherein the instructions, when executed by the one or more processors, cause the apparatus to:

generate second confirmation data for an updated playlist for the content item;

receive a second plurality of segments of the content item; and based on the second confirmation data not matching third confirmation data associated with the received second plurality of segments, cause sending of an error message.

30. One or more non-transitory computer-readable media storing instructions that, when executed, cause:

sending, by a computing device, a playlist indicating a playback order of a plurality of segments of a content item;

receiving one or more requests for the plurality of segments;

sending the plurality of segments, wherein one or more of the plurality of segments omits, based on one or more rules, confirmation data usable to verify the plurality of segments before output; and causing, based on determining that no confirmation data is included in a segment of the content item and that an amount of time has elapsed following reception of confirmation data associated with the content item, an error routine.

31. The one or more non-transitory computer-readable media of claim 30, wherein the one or more rules indicate a time limit for embedding confirmation data, and wherein the instructions, when executed, further cause:

selecting segments, among the plurality of segments based on the time limit; and embedding confirmation data in the selected segments.

32. The one or more non-transitory computer-readable media of claim 30, wherein the one or more rules indicate a threshold quantity of segments for embedding confirmation data, and wherein the instructions, when executed, further cause:

selecting segments, among the plurality of segments, based on the threshold; and embedding confirmation data in the selected segments.

33. One or more non-transitory computer-readable media storing instructions that, when executed, cause:

sending, by a computing device based on a playlist, one or more requests for a plurality of segments of a content item;

receiving the plurality of segments, wherein at least one of the plurality of segments omits, based on one or more rules, confirmation data;

based on verifying one or more of the plurality of segments using confirmation data, causing output, via a visual display device, of the one or more of the plurality of segments in a playback order indicated by the playlist; and based on determining that no confirmation data is included in a segment of the content item and that an amount of time has elapsed following reception of confirmation data associated with the content item, causing sending of an error message.

34. The one or more non-transitory computer-readable media of claim 33, wherein the instructions, when executed, further cause:

generating confirmation data for the playlist, wherein the verifying one or more of the plurality of segments comprises determining that the generated confirmation data matches received confirmation data.

35. The one or more non-transitory computer-readable media of claim 33, wherein the instructions, when executed, further cause:

decrypting a segment of the plurality of segments; and determining that confirmation data is embedded in a data tag of the segment.

36. A system comprising:

an apparatus configured to:

send a playlist indicating a playback order of a plurality of segments of a content item;

receive one or more requests for the plurality of segments;

send the plurality of segments, wherein one or more the plurality of segments omits, based on one or more rules, confirmation data usable to verify the plurality of segments before output; and cause, based on determining that no confirmation data is included in a segment of the content item and that an amount of time has elapsed following reception of confirmation data associated with the content item, an error routine; and a computing device configured to send the one or more requests for the plurality of segments.

37. The system of claim 36, wherein the one or more rules indicate a time limit for embedding confirmation data, and wherein the apparatus is further configured to:

select segments, among the plurality of segments, based on the time limit; and embed confirmation data in the selected segments.

38. The system of claim 36, wherein the one or more rules indicate a threshold quantity of segments for embedding confirmation data, and wherein the apparatus is further configured to:

select segments, among the plurality of segments, based on the threshold; and embed confirmation data in the selected segments.

39. The system of claim 36, wherein the apparatus is further configured to:

receive a request for a segment of the plurality of segments, and send the plurality of segments by causing sending the segment based on receiving the request.

40. A system comprising:

an apparatus configured to:

send, based on a playlist, one or more requests for a plurality of segments of a content item;

receive the plurality of segments, wherein at least one of the plurality of segments omits, based on one or more rules, confirmation data;

based on verifying one or more of the plurality of segments using confirmation data, cause output, via a visual display device, of the one or more of the plurality of segments in a playback order indicated by the playlist; and based on determining that no confirmation data is included in a segment of the content item and that an amount of time has elapsed following reception of confirmation data associated with the content item, causing sending of an error message; and a computing device configured to receive the one or more requests for the plurality of segments of the content item.

41. The system of claim 40, wherein the apparatus is further configured to:

generate confirmation data for the playlist; and verify the one or more of the plurality of segments by causing determining that the generated confirmation data matches received confirmation data.

42. The system of claim 40, wherein the apparatus is further configured to:

decrypt a segment of the plurality of segments; and determine that confirmation data is embedded in a data tag of the segment.

* * * * *